(12) United States Patent
Veronesi et al.

(10) Patent No.: US 9,419,502 B2
(45) Date of Patent: *Aug. 16, 2016

(54) ADDITIVE MANUFACTURING OF A COMPONENT HAVING A LAMINATED STACK OF LAYERS

(75) Inventors: William A. Veronesi, Hartford, CT (US); Tahany Ibrahim El-Wardany, Bloomfield, CT (US); Sameh Dardona, South Windsor, CT (US); Wayde R. Schmidt, Pomfret Center, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 971 days.

This patent is subject to a terminal disclaimer.

(21) Appl. No.: 13/566,615

(22) Filed: Aug. 3, 2012

(65) Prior Publication Data

US 2014/0035423 A1    Feb. 6, 2014

(51) Int. Cl.
*H01F 7/06* (2006.01)
*H02K 15/00* (2006.01)
*H02K 15/02* (2006.01)

(52) U.S. Cl.
CPC ............ *H02K 15/00* (2013.01); *H02K 15/0012* (2013.01); *H02K 15/02* (2013.01); *Y10T 156/10* (2015.01)

(58) Field of Classification Search
CPC ........ B23B 7/12; B23B 15/011; B23B 27/04; B23B 27/30; B23B 37/02; B23B 37/04; B23B 37/065; B23B 37/08; B23B 37/16; H02K 37/12; H02K 21/12; Y10T 29/49002; Y10T 29/49009; Y10T 29/49012; Y10T 29/49078

USPC ................ 29/592.1, 596, 598, 605, 606, 609; 310/90, 179, 184, 198, 208, 215, 258, 310/259

See application file for complete search history.

(56) References Cited

U.S. PATENT DOCUMENTS

| 3,202,851 A | * | 8/1965 | Dehlendorf | .............. H02K 1/16 29/521 |
| 3,203,077 A | * | 8/1965 | Zimmerle | ............ H02K 15/024 29/429 |
| 4,356,377 A | | 10/1982 | Norton et al. | |

(Continued)

FOREIGN PATENT DOCUMENTS

| CA | 2411675 A1 | 5/2003 |
| WO | WO00/00344 A1 | 1/2000 |

OTHER PUBLICATIONS

Xiaojun Wu et al., "A CAD modeling system for heterogeneous object", Advances in Engineering Software, Jan. 18, 2008, pp. 444 to 453, vol. 39, No. 5.

(Continued)

*Primary Examiner* — Paul D Kim
(74) *Attorney, Agent, or Firm* — Kinney & Lange, P.A.

(57) ABSTRACT

A method of making a component comprises producing a layer of sheet material including an aperture over a movable support. An insulating material is deposited in a first portion of the aperture to form an insulating coating with one or more pockets. A conductive material is deposited in the one or more pockets. Heat and pressure are applied to the layer and the movable support is lowered by a thickness of the layer. The steps are repeated to form a laminated stack defining the component. In some embodiments, the laminated stack of sheet materials forms an induction machine.

15 Claims, 6 Drawing Sheets

(56) References Cited

U.S. PATENT DOCUMENTS

| | | | |
|---|---|---|---|
| 4,560,445 A | | 12/1985 | Hoover et al. |
| 4,578,853 A | * | 4/1986 | Wurth .................... B21D 28/22 29/598 |
| 5,087,849 A | * | 2/1992 | Neuenschwander ... B21D 28/22 310/216.013 |
| 5,338,996 A | * | 8/1994 | Yamamoto ............... H02K 1/26 310/216.048 |
| 5,349,741 A | * | 9/1994 | Neuenschwander ... B21D 28/22 29/596 |
| 6,814,823 B1 | | 11/2004 | White |
| 6,984,913 B2 | * | 1/2006 | Neuenschwander ... B21D 28/22 29/596 |
| 7,352,101 B2 | * | 4/2008 | Fujita .................. H02K 15/022 310/216.011 |
| 2004/0128016 A1 | | 7/2004 | Stewart |
| 2010/0187943 A1 | | 7/2010 | Heim |
| 2012/0009411 A1 | | 1/2012 | Hasz |

OTHER PUBLICATIONS

V. Kumar et al., "A framework for object modeling", Computer-Aided Design, Aug. 1, 1999, pp. 541-556, vol. 51, No. 9.

X.Y. Kou et al., "Heterogeneous object modeling: A review", Computer-Aided Design, Apr. 14, 2007, pp. 284-301, vol. 39, No. 4.

D. Dutta et al., "Heterogeneous Solid Modeling for Layered Manufacturing", Annals of the CIRP, Jan. 1, 2000, pp. 109-112, vol. 49, No. 1.

Debasish Dutta et al. "Layered Manufacturing: Current Status and Future Trends", Jan. 1, 2001, pp. 60 to 71, vol. 1.

Brian B. Mathewson et al., "Machine Design, Control and Performance of Automated Computer-Aided Manufacturing of Laminated Engineering Materials", Proc. 9th Solid Freeform Fabrication Symp., Jan. 1, 1998, pp. 227-238, Austin, Texas, USA.

S. Sandig et al., "Manufacturing of Metallic Prototypes and Tools by Laser Cutting and Diffusion Bonding", Intelligent Processing and Manufacturing of Materials, Jul. 10, 1999, pp. 251 to 253, vol. 1.

Hashem Ghariblu et al., "A new machine for layer manufacturing of metal parts", Proceedings of the 8th International Symposium on Mechatronics and its Applications, Apr. 10, 2012, pp. 1-5.

Alain Bernard et al., "New Trends in Rapid Product Development", Annals of the CIRP, Jan. 1, 2012, pp. 1-18, vol. 51, No. 2.

J.P. Kruth et al., "Progress in Additive Manufacturing and Rapid Prototyping", Annals of the CIRP, Jan. 1, 1998, pp. 525-540, vol. 47, No. 2.

Edson Costa Santos et al., "Rapid manufacturing of metal components by laser forming", International Journal of Machine Tools & Manufacture, Oct. 1, 2006, pp. 1459-1468, vol. 46, No. 12-13.

S.H. Choi et al., "A topological heirarchy-based approach to layered manufacturing of functionally graded multi-material objects", Computers in Industry, Jun. 1, 2009, pp. 349-363, vol. 60, No. 5.

Extended European Search Report, for European Patent Application No. 13178881.2, dated Mar. 12, 2013, 14 pages.

* cited by examiner

ADDITIVE MANUFACTURING OF A COMPONENT HAVING A LAMINATED STACK OF LAYERS

BACKGROUND

The present invention relates to the production of electric machines such as induction motors or generators. Known induction motors use multiple windings of conductive wire within a magnetic case to form a stator section and apply alternating current to these windings to cause a rotor within the stator section to turn. Induction generators work in the opposite way, where the rotor is turned and induces current in the windings. In both induction motors and generators, a magnetizing current is supplied to the rotor by the stator. This comes about due to slip between the rotor coils, often a "squirrel cage" coil configuration, and the rotating field produced by the stator. If the rotor turns faster than the stator field, mechanical power from the rotor is converted to real electrical power in the stator, and vice versa.

SUMMARY

A method of laminating a stack of sheet material, wherein the sheet material is cut and unwanted portions are removed, and additive manufacturing devices are used to build up structures of conducting and insulating materials within slots manufactured in at least some of the sheet materials in the stack. Further, the invention includes a stack of laminated sheet materials with additively manufactured portions, where adjacent sheets include conductive portions which are in electrical contact with one another. In some embodiments, this stack of laminated sheet materials forms an induction machine.

DETAILED DESCRIPTION

In general, the present invention allows for high efficiency induction machines to be constructed that have efficiency comparable to or greater than the efficiencies obtained by permanent magnet machines, without the use of rare earth materials. Induction machines, including induction motors and induction generators, convert electrical energy to or from mechanical energy by rotating a rotor slightly slower or faster, respectively, than a rotating magnetic field produced by alternating currents applied to stator windings. In the case of an induction motor, the rotating magnetic field generated by these windings causes the rotor to rotate and deliver useful mechanical power at a rotor angular speed slightly less than the angular speed of the stator field.

Figure 1:
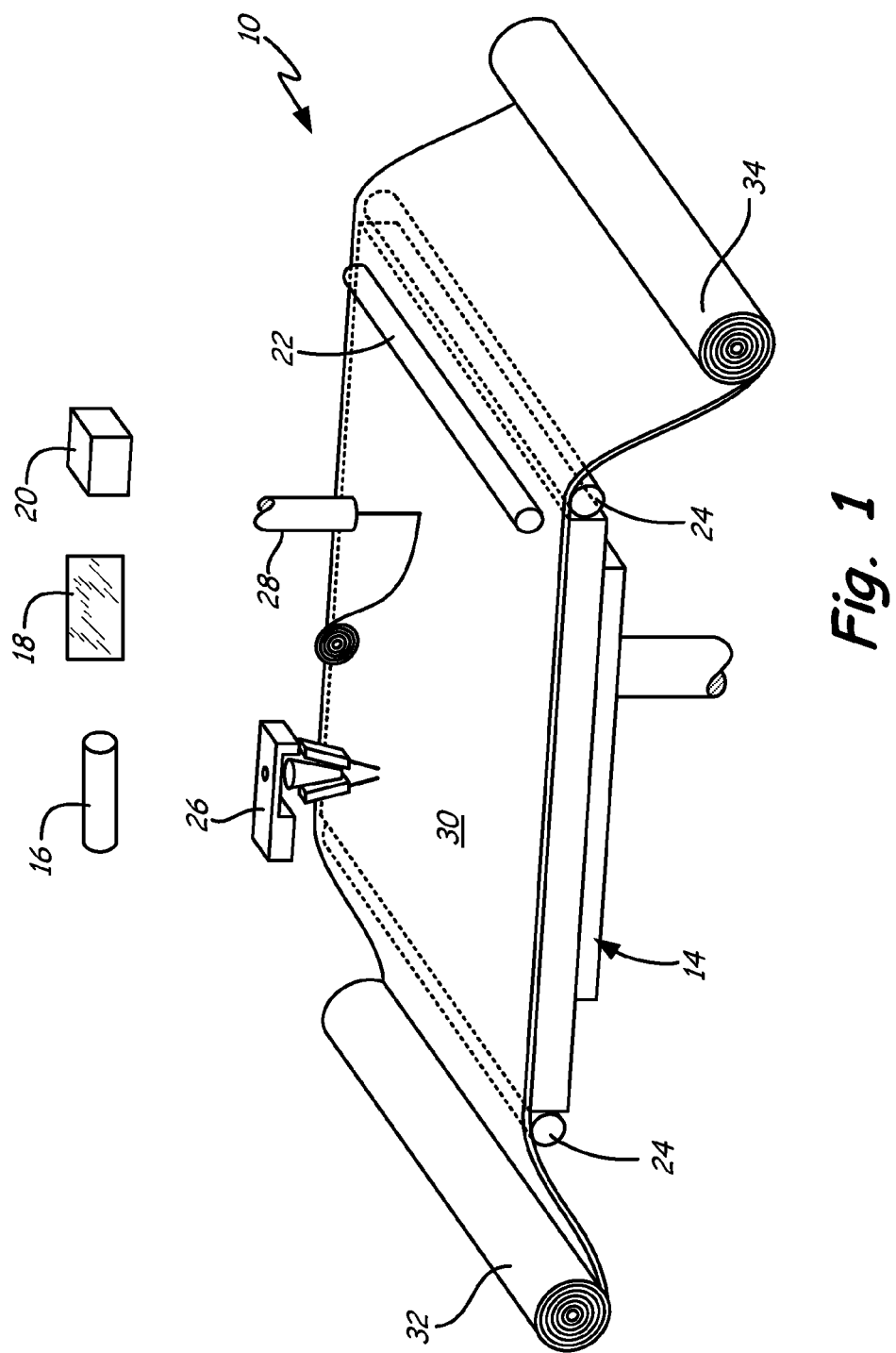
FIG. 1 is a perspective view of a machine used to create electrical machines such as induction machines.

FIG. 1 is a perspective view of rapid manufacturing system 10. FIG. 1 further shows sheet material supply and take-up rolls, and a portion of sheet material on the working surface. The sheet material is coated on both sides with an insulator, for example iron oxide or glass material that has a coefficient of thermal expansion similar to that of the sheet material. Rapid manufacturing system 10 includes movable support 14, laser 16, mirror 18, movable optical head 20, heated roller 22, guides 24, laser additive manufacturing apparatus 26, and electron beam melting apparatus 28. Also shown are sheet material 30, supply roll 32, and take-up roll 34.

Movable support 14 is any solid foundation capable of holding a stack of laminated layers (not shown). Movable support 14 may include a sacrificial, disposable or removable portion, such that objects which are laminated onto support may be removed from rapid manufacturing system 10 more easily. Movable support 14 is attached to an actuator (not shown) which may be used to set the desired vertical position of movable support 14. After each sheet layer is cut to the required shape and the conductor material and insulator material are deposited, the movable support moves down by the thickness of the sheet, a new sheet is positioned over the movable support, and the process is repeated.

Laser 16 is any laser suitable for cutting and sintering operations. For example, in many embodiments, a carbon dioxide laser may be used. Mirror 18 is any mirror which will direct laser radiation. Preferably, mirror 18 is adjustable, such that the radiation incident upon mirror 18 may be selectively aimed. Movable optical head 20 is a device capable of directing incident radiation onto the surface of sheet material 30. For example, movable optical head 20 may include a mirror, a lens, or other optics for focusing a laser beam. Further, movable optical head 20 may move in the region above movable support 14, for example using an x-y positioning stage. Multiple lasers may be used, for example, for separate cutting and sintering operations, with corresponding mirrors and movable optical heads. In addition, an electron beam head can be used instead of a movable laser head. The surrounding environment is dependent on the type of additive manufacturing energy source.

Heated roller 22 is heated and movable above movable support 14. In the embodiment shown in FIG. 1, heated roller 22 is a cylinder. In alternative embodiments, heated roller may be a heated arc or knife blade laminator. Guides 24 as shown in FIG. 1 are rollers, but in alternative embodiments may be any fixed or rotatable arcuate structures. Heated roller 22 may also be integrated with an ultrasonic device to increase the efficiency of joining the laminates with the insulator layers.

Laser additive manufacturing apparatus 26 may be any laser additive manufacturing (LAM) apparatus recognized by those skilled in the art. For example, laser additive manufacturing apparatus 26 may be a Laser Engineered Net Shaping (LENS) apparatus, Direct Metal Laser Sintering (DMLS) apparatus, Laser Powder Deposition (LPD) apparatus, or Selective Laser Sintering (SLS) apparatus for polymers or metals. Additive manufacturing apparatus 26 may either include its own laser for softening, melting or sintering pulverant material, or laser 16 may be used to soften, melt or sinter the pulverant material (not shown) deposited by laser additive manufacturing apparatus 26. Electron beam melting apparatus 28 may be any electron beam melting apparatus recognized by those skilled in the art. For example, electron beam melting apparatus 28 may be an Electron Beam Melting (EBM) apparatus or Electron Beam Wire (EBW) apparatus.

Sheet material 30 is a flexible sheet of any material which is desirable for building into a three-dimensional structure. For example, sheet material 30 may be a sheet of high silicon steel alloy. Sheet material 30 may include a diffusion layer, such as a layer of glass, iron oxide, polyamide, silicone, phenolic or polyether ether ketone (PEEK). Supply roll 32 is a cylindrical core with sheet material 30 wrapped around the cylindrical core. Similarly, take-up roll 34 is a cylindrical core with sheet material 30 wrapped around the cylindrical core.

Movable support 14 is free to move towards or away from sheet material 30 between supply roll 32 and take-up roll 34. Typically, movable support 14 has a range of motion that is at least as large as the height of the desired stack of laminated layers (not shown). In alternative embodiments, movable support 14 may stay in a fixed position while rollers 24 are moved relative to movable support 14.

Radiation (a laser beam) from laser 16 radiates towards mirror 18, which directs the radiation towards movable optical head 20. Mirror 18 is not necessary in all embodiments, and persons of ordinary skill in the art will recognize that alternatives, such as fiber optics, may be substituted to transmit radiation from laser 16 to movable optical head 20. Alternatively, movable optical head 20 may not be necessary in embodiments where mirror 16 directs radiation towards its ultimate target. Movable optical head 20 is capable of moving into positions where it can direct radiation towards laser additive manufacturing apparatus 26 or sheet material 30. Heated roller 22 is movable across sheet material 30, and may be used to apply heat and pressure to layers of a laminated stack (not shown) to cause binding of layers by inter-diffusion of adjacent diffusion layers.

Additive manufacturing apparatus 26 is movable along the surface of sheet material 30 opposite from movable support 14. Additive manufacturing apparatus 26 may selectively deposit pulverant material. Electron beam melting apparatus 28 may also be used to selectively deposit pulverant material. Electron beam melting apparatus 28 is also movable about the surface of sheet material 30 opposite movable support 14. In alternative embodiments, additive manufacturing apparatus 26 and electron beam melting apparatus 28 may be substituted; for example, alternative embodiments may have two (or more) additive manufacturing apparatuses and/or two (or more) electron beam melting apparatuses.

Sheet material 30 is rolled into both supply roll 32 and take-up roll 34. Sheet material 30 is guided by guides 24, and passes above movable support 14. Additionally, sheet material 30 passes under movable head 20, additive manufacturing apparatus 26, electron beam melting apparatus 28, and heated roller 22. Supply roll 32 and take-up roll 34 are rotatable to advance sheet material 30 across movable support 14 or the laminated stack (see FIG. 3). It will be understood by those skilled in the art that in alternative embodiments, sheet layers may be formed by stamping, laser deposition, electron beam deposition, or other additive or subtractive manufacturing methods. The alternative of generating the laminate by using the laser additive manufacturing process and depositing high silicon steel powder alloy will allow the fabrication of controlled grain-oriented silicon steel laminates for magnetic structures, which will lead to decreasing core loss especially for high frequency or high harmonic designs.

The embodiment shown in FIG. 1 is used to create layers of components such as induction machines. Sheet material 30 is advanced to at least partially cover movable support 14. Laser 16 is used to cut an outer periphery of a layer. Radiation from laser 16 is reflected off of mirror 18 in the direction of movable optical head 20. Movable optical head 20 redirects the radiation towards a desired target. Laser additive manufacturing apparatus 26 is used to selectively deposit pulverant material by applying powder to selected regions, then using radiation from laser 16 to sinter or melt the pulverant material in desired locations. Electron beam melting apparatus 28 may also be used to selectively deposit material. Electron beam melting apparatus 28 melts metal wire stock or pulverant material in desired locations using an electron beam. Heated roller 22 is used to apply heat and pressure to a cut portion of sheet material 30 with deposited material from laser additive manufacturing apparatus 26 or electron beam melting apparatus 28.

The combination of additive manufacturing processes such as laser additive manufacturing apparatus 26 or electron beam melting apparatus 28 with laser cutting of sheet material allows for rapid manufacturing of objects with multiple materials throughout the body of the object. By repeatedly cutting and building up layers using the processes shown in FIG. 1, a component may be built which is very difficult or even impossible to create using traditional manufacturing processes.

Figure 2A:
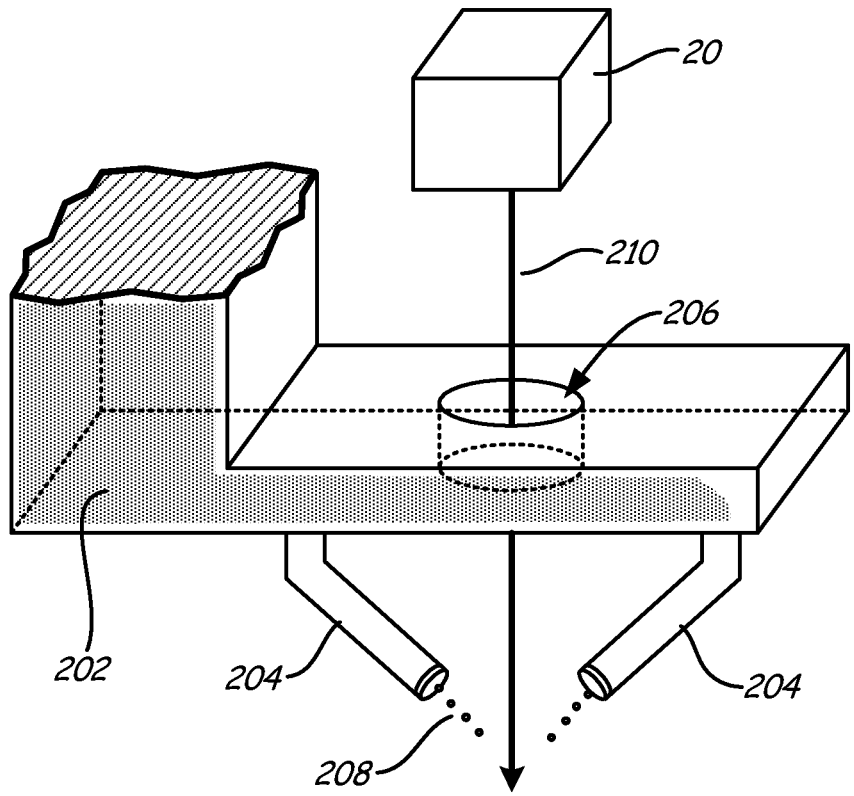
FIG. 2A is a cross-sectional view of a laser engineered net shaping device using powder material.

FIG. 2A shows an example of a laser additive manufacturing apparatus 26. Laser additive manufacturing apparatus 26 includes pulverant material reservoir 202, two pulverant material dispensers 204, and laser guide 206. Pulverant material reservoir 202 is any container suitable for holding pulverant material 208. Pulverant material dispensers 204 may be opened or closed to selectively restrict flow of material. Laser guide 206 is shown as a channel in pulverant material reservoir 202. Pulverant material 208 may be any pulverant material suitable for use in additive manufacturing, such as fine powders of conductors or insulators. For example, pulverant material 208 may be copper powder, or green glass powder. Laser radiation path 210 is a line along which movable optical head 20 may direct laser radiation.

Pulverant material reservoir 202 is connected to pulverant material dispensers 204, which selectively restrict or allow flow of pulverant material 208. Laser radiation path 210 passes through laser guide 206 and intersects the path of pulverant material 208 which is dispensed from pulverant material dispenser 204.

In use, laser additive manufacturing apparatus 26 as shown in FIG. 2A moves in tandem with movable optical head 20. Typically, laser 16 (shown in FIG. 1) and movable optical head 20 are used for additional functions, such as cutting or in other additive manufacturing processes. Therefore, laser additive manufacturing apparatus 26 need only be positioned in tandem with movable optical head 20 while additive manufacturing is occurring. In alternative embodiments, pulverant material 208 may be deposited by laser additive manufacturing apparatus 26 before movable optical head 20 sinters or melts pulverant material 208. In those embodiments, it is not necessary for laser additive manufacturing apparatus 26 to include laser guide 206, nor is it necessary for laser additive manufacturing apparatus 26 to move in tandem with movable optical head 20. In alternate embodiments, additional pulverant material reservoirs containing additional types of pulverant material may be used.

Laser additive manufacturing apparatus 26 is one type of apparatus which may be used to build up structures within each of the sheets in a laminated stack of sheets. After an outer periphery and interior apertures are lased and unwanted sheet material is removed, laser additive manufacturing apparatus 26 may be used to build up any type of meltable or sinterable structure, such as insulating coatings or sections of conductive windings.

Figure 2B:
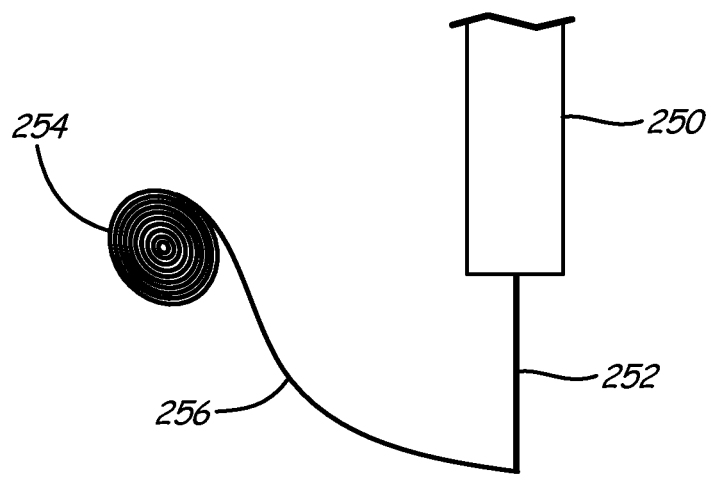
FIG. 2B is a side view of an electron beam melting device using a metal wire.

FIG. 2B shows an example of electron beam melting apparatus 28. Electron beam melting apparatus 28 as shown in FIG. 2B includes electron beam source 250, electron beam 252, spool 254, and meltable material 256. Electron beam source 250 is a device which is capable of producing high energy electrons and focusing them into electron beam 252. For example, electron beam source 250 may be a wire filament carrying a current, a high voltage accelerating circuit, and a series of magnets directing excited electrons through a metal foil window.

Spool 254 is unwound such that an end of meltable material 256 transects electron beam 252 as it emanates from electron beam source 250. Where electron beam 252 transects meltable material 256, meltable material 256 melts. Electron beam melting apparatus 28 may be moved such that melted portions of meltable material 256 are deposited in desired locations. In alternative embodiments, meltable material 256 may be delivered in powder form to the desired location.

By moving electron beam melting apparatus 28 to deposit melted portions of meltable material 256 in desired locations, electron beam melting apparatus 28 may be used as another way to additively manufacture features in each layer of a stack of a laminated stack of sheet materials. For example, electron beam melting apparatus 28 may be used to deposit insulating coatings or sections of conducting windings.

Figure 3:
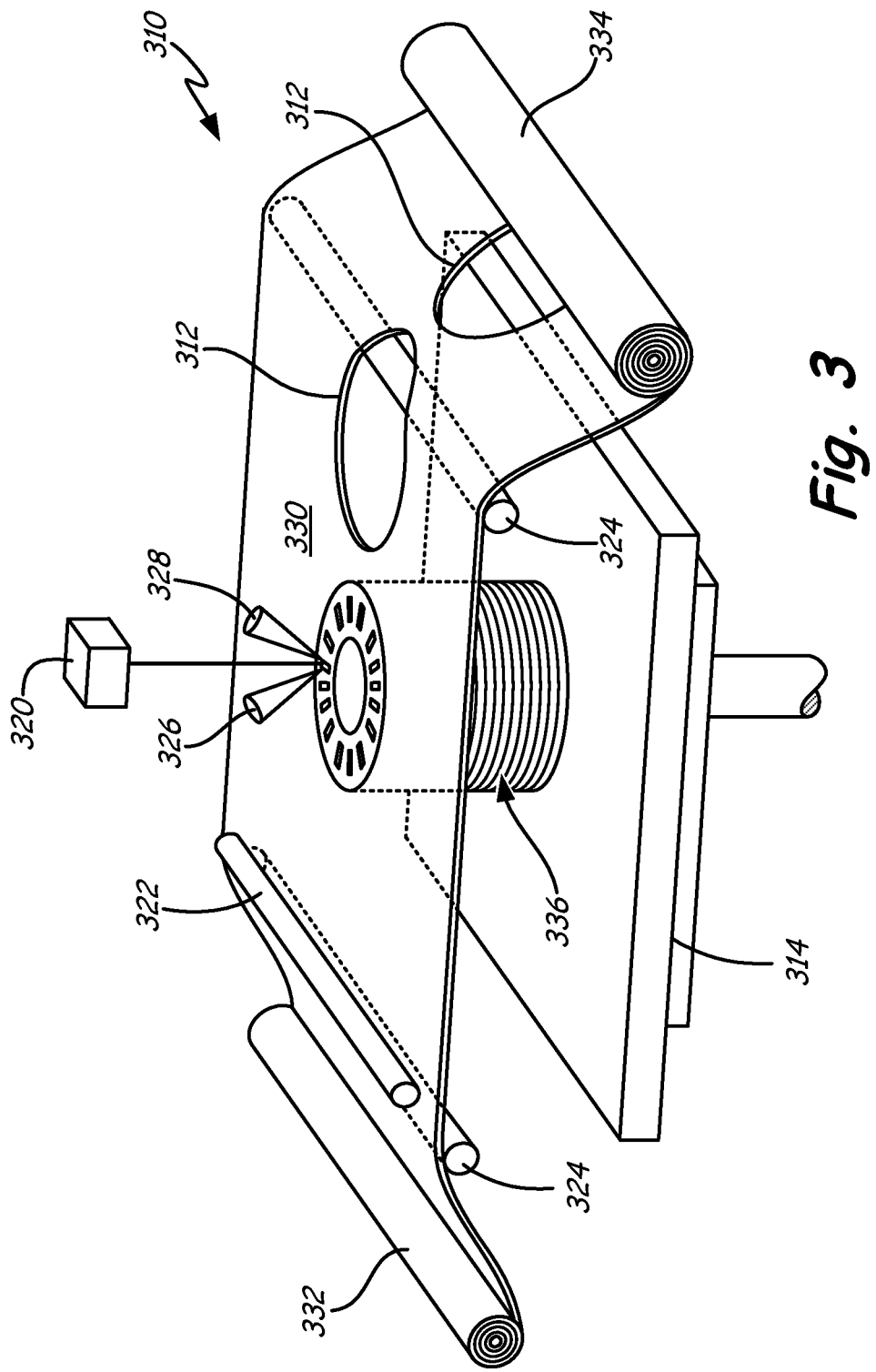
FIG. 3 is a perspective view of a machine used to create induction machines, with several layers of the induction machine completed.

FIG. 3 shows rapid manufacturing system 310 partway through building a component. Rapid manufacturing system 310 includes movable optical head 320, heated roller 322, guides 324, first LAM apparatus 326, and second LAM apparatus 328. First LAM apparatus 326 and second LAM apparatus 328, as shown in FIG. 3, are both LENS type additive manufacturing devices. As shown in FIG. 3, first LAM apparatus 326 is used in conjunction with laser radiation directed by movable optical head 320 to sinter insulating material. Likewise, as shown in FIG. 3, second LAM apparatus 328 is used in conjunction with laser radiation directed by movable optical head 320 to sinter conductive material. Also shown are sheet material 330, supply roll 332, take-up roll 334, and laminated stack 336. Laminated stack 336 is a stack of layers, wherein each layer is made up of a combination of sheet material 330, insulated deposited by first LAM apparatus 326, and conductive material deposited by second LAM apparatus 328. Also shown are hole outlines 312. Each hole outline 312 is the laser cut outline of material which has been cut from sheet material 330, including the layer, apertures, and waste material.

Movable optical head 320 receives laser radiation from a laser source (not shown) and directs it towards desired locations on sheet material 330. Rapid manufacturing system 310 has cut hole outlines 312 into sheet material 330. Sheet material 330 passes between movable support 314 and movable optical head 320. Movable support 314 may also move away from sheet material 330 such that laminated stack 336 is directly beneath sheet material 330 and fills part of the space between movable support 314 and sheet material 330. First LAM apparatus 326 and second LAM apparatus 328 are arranged on the same side of sheet material 330 as movable optical head 320. Heated roller 322 is also arranged on the same side of sheet material 330 as movable optical head 320. Guides 324 set the position of sheet material 330.

As sheet material 330 is advanced from supply roll 332 to above movable support 314 to take-up roll 334, movable optical head 320 directs laser radiation toward the hole outlines 312 in sheet material 330. Within these lased outlines, movable optical head 320 may cut additional features, such as an outer periphery of a layer as well as apertures for desired features within the layer. Some portion of the material within each outline is removed and either discarded or recycled. Such removal is typically accomplished using pressurized inert gas. First LAM device 326 and second LAM device 328 are used to deposit sinterable or meltable materials in desired locations. For example, first LAM device 326 may be used to deposit a sinterable insulating material within apertures cut by laser radiation emanating from movable optical head 320. The insulating material deposited by first LAM device 326 need not fill the entirety of apertures cut by laser radiation emanating from movable optical head 320. Rather, it is sometimes desirable to additively manufacture additional features of a different material. For example, second LAM device 328 may deposit conductive material within the apertures cut by laser radiation emanating from movable optical head 320.

Each time a layer of sheet material 330 is cut and additive manufacturing is complete, heated roller 322 laminates the layer to an underlying structure and movable support 314 moves away from sheet material 330 by the roughly the thickness of one layer. The thickness of each layer is set by the thickness of sheet material 330. For example, many sheet materials will be between 0.10 and 0.25 mm thick. The amount of movement of movable support 314 may be different from the thickness of sheet material 330, if lamination by heated roller 322 causes any change to the thickness of the layer. The layer becomes the topmost part of laminated stack 336, and also the physical support for the next layer that is constructed. After lamination and movement of movable support 314, supply roll 332 and take-up roll 334 rotate to advance a different portion of sheet material 330 over movable support 314 and laminated stack 336.

FIG. 3 shows how a laminated stack can be constructed using multiple additive manufacturing devices in one apparatus. Using multiple additive manufacturing devices in one apparatus allows for construction of components which were previously difficult or impossible to construct.

Figure 4:
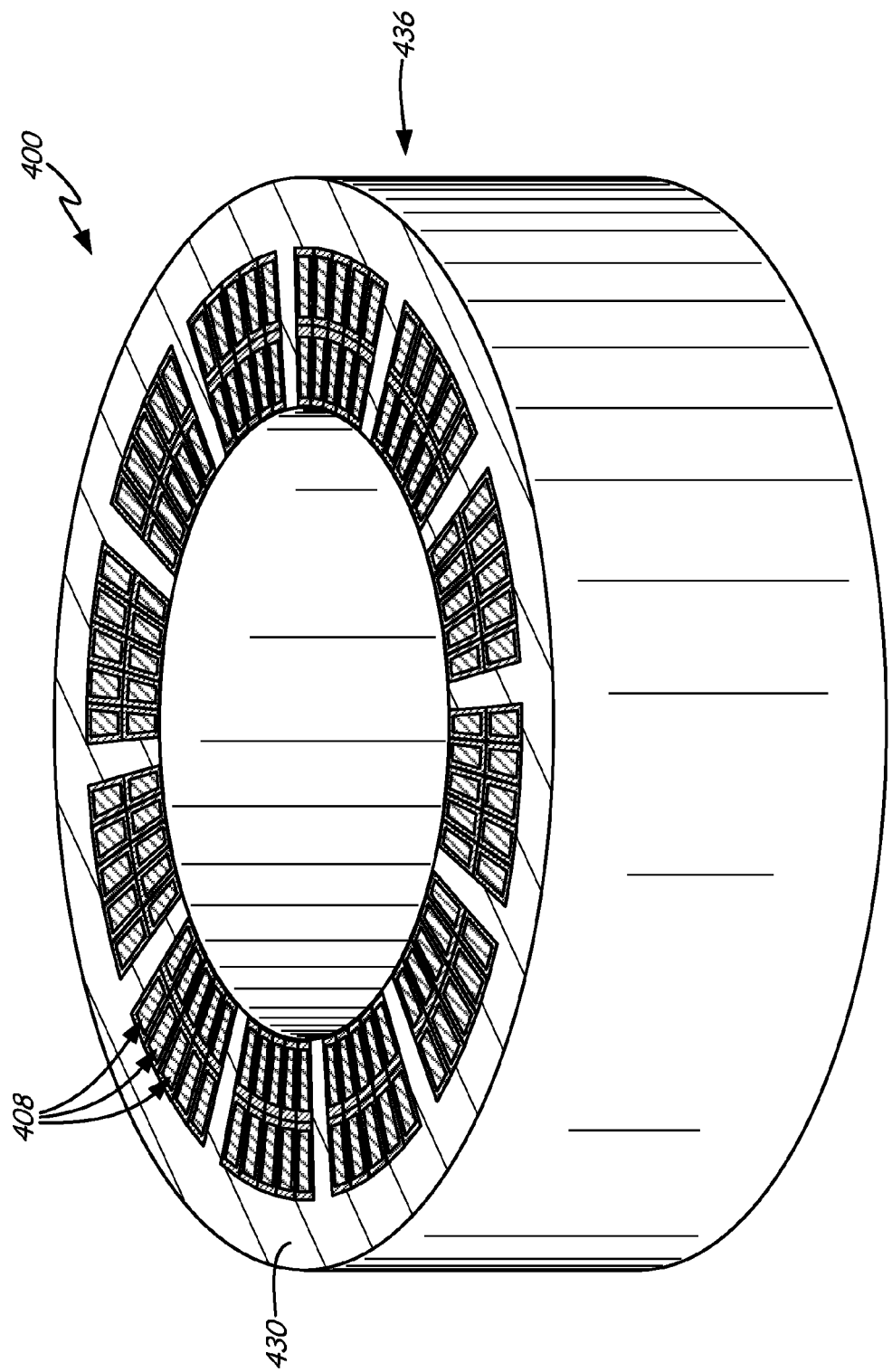
FIG. 4 is a perspective cutaway of a stator.

FIG. 4 shows component 400, which includes additively manufactured features 408 within sheet material 430. Component 400 may be any component that is built using two or more additive manufacturing materials within apertures in a laser-cut structure. For example, component 400 may be an induction machine such as an induction motor or an induction generator, wherein the laser-cut structure is a magnetic material such as silicon steel, and two additive manufacturing materials are a PEEK insulator disposed along the border of laser-cut apertures in the silicon steel and copper disposed along the inside border of the PEEK. Additively manufactured features 408 are typically segments of additively manufactured conductive material insulated by additively manufactured insulating material.

Additively manufactured features 408 are typically arranged within apertures in sheet material 430 such that conductive additively manufactured features are aligned with conductive additively manufactured features in at least one adjacent layer of laminated stack 436. Insulating additively manufactured features are typically arranged to prevent electrical contact between conductive additively manufactured features and sheet material 430, either in the same layer of laminated stack 436 or in adjacent layers of laminated stack 436.

In order to create an induction machine, windings are frequently used to generate magnetic fields when current is applied. By choosing appropriate arrangements of additively manufactured features 408 in each layer of laminated stack 436, component 400 may include windings of conductive material which are insulated from sheet material 430. Additionally, additively manufactured features 408 may have their topology optimized to reduce interference and eddy currents as a result of current flowing through such windings.

Additively manufactured components such as the one shown in FIG. 4 have numerous advantages over similar components made using alternative manufacturing techniques. Induction motor components may be additively manufactured which use materials more efficiently and optimize the position of windings within the induction machine more precisely. By optimizing the design of magnetic, insulating, and conductive materials, it is possible to eliminate the use of rare earth materials in the motor, while maintaining efficiencies greater than those presently achieved in devices which do include rare earth materials. Further, it is possible to make induction machines which are more lightweight and smaller than their counterparts that are not made using multiple additive manufacturing processes.

Figure 5:
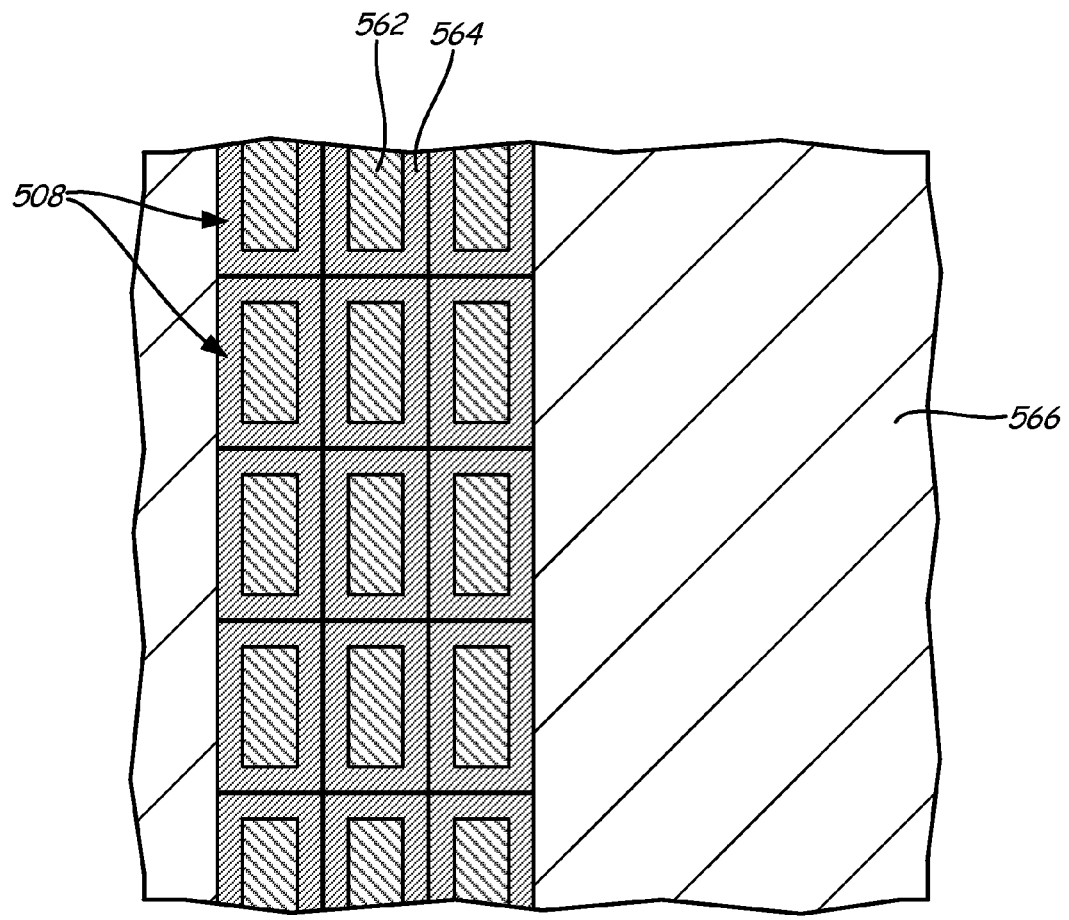
FIG. 5 is a cross-sectional view of an additively manufactured component, showing a pattern of additively manufactured conductive windings encased in additively manufactured insulator regions encased in sheet material.

FIG. 5 shows the surface of one layer in a laminated stack. FIG. 5 includes additively manufactured features 508, each of which includes conductive material 562 and insulating material 564, within sheet material 566. As in previously described embodiments, conductive material 562 is any conductive material, and preferably one with low resistivity such as copper. Insulating material 564 may be any insulating material which prevents electrical contact between conductive material 562 and sheet material 566. For example, insulating material 564 may be a high-melting-temperature polymer, or an oxide.

Additively manufactured features 508 are arranged throughout apertures cut in sheet material 566. Within each aperture is an insulating coating made of insulating material 564, and within at least some of those insulating coatings are pockets within which conductive material 562 is disposed. In some embodiments, sheet material may be arranged between groups of additively manufactured features. In other embodiments, such as the one shown in FIG. 5, it is not necessary for interstices 568 to be present. Further, the shape of insulating and conductive materials may vary. For example, a large aperture could be present in sheet material 566, and insulating material 564 could be arranged within the aperture and include a honeycomb, grid, or other arrangement of pockets within which conductive material is disposed.

In some embodiments, the structure of additively manufactured features 508 may be selected such that, in combination with additively manufactured features in other layers (not shown), the conductive portions combine to form intertwined conductor paths similar to Litz wire or other alternating current (AC) resistivity-reducing topologies. In many embodiments, insulating material 564 is present between each conductive material 562 and sheet material 566.

FIG. 5 demonstrates the high packing density which is possible using additive manufacturing. Traditionally, induction machine windings are created using wrappings of conductive wire which has been coated with an insulator. Such windings are much less dense than the windings that can be additively manufactured. Shaped and oriented individual windings may be included in additively manufactured components such as the one shown in FIG. 5, such as Litz wire and end wrapping topologies.

Figure 6:
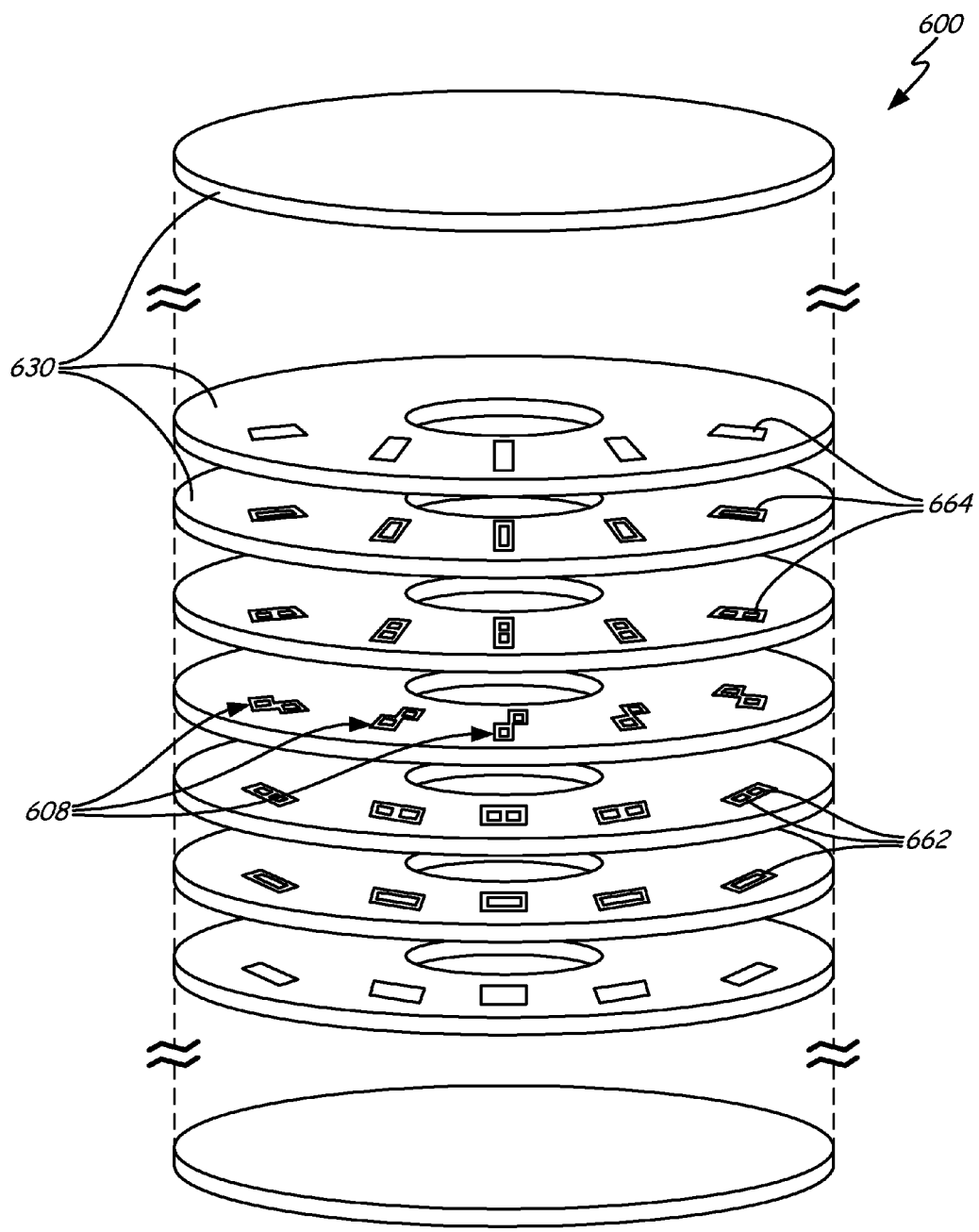
FIG. 6 is an exploded view of multiple layers of a laminated stack, showing a simplified winding structure.

FIG. 6 is an exploded view of a stack of laminated layers. Component 600 is made of several layers of sheet material 630, some of which contain additively manufactured features 608. Conductive material 662 fills pockets formed by insulating material 664 and the underlying layer.

The layers of conductive material 662, insulating material 664, and sheet material 630 are arranged such that conductive material 662 in each layer is electrically connected to conductive material 662 in at least one adjacent layer. Furthermore, insulating material 664 is arranged such that there is no electrical connection between conductive material 662 and sheet material 630.

The exploded view in FIG. 6 shows a simplified set of windings. In the diagram shown, the windings are twisted loops, but in other embodiments the loops may not be twisted. By providing untwisted loops, and disposing large quantities of interconnected loops, an induction machine stator may be constructed.

Improved stators may be created using additive manufacturing by placing these windings closer together than was previously possible with wire windings, and by optimizing the topology of the windings and their dimensions. Further, the relative thickness of the sheet metal or magnetic material may be decreased and it can be manufactured at the same time as the windings. These improvements mean a thinner magnetic portion with less eddy currents, less material used, and higher efficiencies.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

Discussion of Possible Embodiments

The following are non-exclusive descriptions of possible embodiments of the present invention.

A method including (a) producing a layer of a sheet material including an aperture over a movable support, wherein the layer has a thickness and an outer periphery; (b) depositing an insulating material in a first portion of the aperture, adjacent to the outline of the aperture, to form an insulating coating with one or more pockets; (c) depositing a conductive material in the one or more pockets; (d) applying heat and pressure to the layer; (e) lowering the movable support by the thickness of the layer; and (f) repeating steps (a)-(e) to form a laminated stack of layers that define a component.

The method of the preceding paragraph can optionally include, additionally and/or alternatively, any one or more of the following features, configurations and/or additional components:

producing the layer of the sheet material includes positioning the sheet material over the movable support, laser cutting the sheet material to define the outer periphery of the layer, removing the sheet material outside the outer periphery of the layer, laser cutting the outline of the aperture in the layer, and removing the sheet material within an outline of the aperture;

laser welding the outer periphery of the layer;

depositing all of the sheet material, the insulating material, and the conductive material necessary to form the component;

depositing the conductive material in the one or more pockets further includes depositing the conductive material such that the conductive material in the one or more pockets is electrically connected to the conductive material in a pocket of at least one adjacent layer of the laminated stack of layers, and is electrically insulated from the sheet material by the insulating coating;

the sheet material includes steel coated with a diffusion layer;

the diffusion layer includes at least one of: glass, iron oxide, PEEK, phenolic, polyamide, and silicone;

the conductive material is copper;

the insulating material is one of the group consisting of: ceramic insulators, polymeric insulators, and insulating oxides;

laminating includes melting the diffusion layers of adjacent pieces of the sheet material;

depositing the insulating material includes using laser additive manufacturing to sinter the insulating material;

depositing the conducting material includes using laser additive manufacturing to sinter the conducting material;

depositing the conducting material includes using electron beam melting to melt the conducting material; and removing the sheet material is accomplished using pressurized gas.

An apparatus includes a stack of laminated layers, at least one of the layers including a sheet material including at least one aperture; an insulating material arranged in a first portion of the aperture, adjacent to the sheet material; and a conducting portion arranged in a second portion of the aperture, adjacent to the insulating material, wherein the conducting portion of each layer is arranged in electrical contact with the conducting portion of at least one adjacent layer.

The apparatus of the preceding paragraph can optionally include, additionally and/or alternatively, any one or more of the following features, configurations and/or additional components:

the conducting portions of the stack of laminated layers form conductive windings of an electric machine;

the apparatus does not contain any rare-earth materials; and the topology of the conductive windings are optimized for use as an induction machine.

A method of forming a component of an induction machine includes forming a plurality of layers of steel sheet with apertures for conductive windings, forming by additive manufacturing an electrically conductive winding layer within the aperture surrounded by an electrically insulating layer so that the winding layer is electrically insulated from the steel sheet, and laminating a plurality of sheets with the apertures aligned to form a component body of laminated steel sheets having insulated conductive windings extending through the component body.

The method of the preceding paragraph can optionally include the feature that the induction machine is one of an induction motor or an induction generator.

The invention claimed is:

1. A method of making a component, the method comprising:
   (a) producing a layer of a sheet material including an aperture over a movable support, wherein the layer has a thickness and an outer periphery;
   (b) depositing an insulating material in a first portion of the aperture, adjacent to the outline of the aperture, to form an insulating coating with one or more pockets;
   (c) depositing a conductive material in the one or more pockets;
   (d) applying heat and pressure to the layer;
   (e) lowering the movable support by the thickness of the layer; and
   (f) repeating steps (a)-(e) to form a laminated stack of layers that define the component.

2. The method of claim 1, wherein producing the layer of the sheet material comprises:
   positioning the sheet material over the movable support;
   laser cutting the sheet material to define the outer periphery of the layer;
   removing the sheet material outside the outer periphery of the layer;
   laser cutting the outline of the aperture in the layer; and
   removing the sheet material within an outline of the aperture.

3. The method of claim 2, wherein removing the sheet material is accomplished using pressurized gas.

4. The method of claim 1, further comprising laser welding the outer periphery of the layer.

5. The method of claim 1, wherein depositing the conductive material in the one or more pockets further comprises:
   depositing the conductive material such that the conductive material in the one or more pockets is electrically connected to the conductive material in a pocket of at least one adjacent layer of the laminated stack of layers, and is electrically insulated from the sheet material by the insulating coating.

6. The method of claim 1, wherein the sheet material includes steel coated with a diffusion layer.

7. The method of claim 6, wherein the diffusion layer includes at least one of: glass, iron oxide, PEEK, phenolic, polyamide, and silicone.

8. The method of claim 6, wherein the diffusion layers of adjacent pieces of the sheet material are melted by the step of applying heat and pressure to each layer.

9. The method of claim 1, wherein the conductive material is copper.

10. The method of claim 1, wherein the insulating material is one of the group consisting of: ceramic insulators, polymeric insulators, and insulating oxides.

11. The method of claim 1, wherein depositing the insulating material includes using laser additive manufacturing to sinter the insulating material.

12. The method of claim 1, wherein depositing the conducting material includes using laser additive manufacturing to sinter the conducting material.

13. The method of claim 1, wherein depositing the conducting material includes using electron beam melting to melt the conducting material.

14. The method of claim 1, wherein the component is part of an induction machine, and wherein the conductive material is a conductive winding surrounded by the insulating material.

15. The method of claim 14, wherein the induction machine is one of an induction motor or an induction generator.

* * * * *